United States Patent
Juma et al.

(10) Patent No.: US 12,296,773 B1
(45) Date of Patent: May 13, 2025

(54) ROOF AIRBAGS AND METHODS OF INSTALLATION THEREOF

(71) Applicant: GM GLOBAL TECHNOLOGY OPERATIONS LLC, Detroit, MI (US)

(72) Inventors: Jamal Juma, Macomb, MI (US); Kenneth M. Zawisa, Brighton, MI (US); Kenneth Douglas Moniaci, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/736,454

(22) Filed: Jun. 6, 2024

(51) Int. Cl.
*B60R 21/213* (2011.01)
*B62D 65/14* (2006.01)

(52) U.S. Cl.
CPC ............ *B60R 21/213* (2013.01); *B62D 65/14* (2013.01)

(58) Field of Classification Search
CPC .................................................... B60R 21/213
See application file for complete search history.

(56) References Cited

U.S. PATENT DOCUMENTS

| | | | |
|---|---|---|---|
| 9,266,492 B2 * | 2/2016 | Byun | B60R 21/213 |
| 11,192,518 B2 * | 12/2021 | Kang | B60R 21/213 |
| 11,254,279 B2 * | 2/2022 | Lee | B60R 21/213 |
| 11,603,065 B2 * | 3/2023 | Callewaert | B60R 21/20 |
| 11,608,021 B2 * | 3/2023 | DiTrapani | B60R 21/232 |
| 12,097,819 B2 * | 9/2024 | Ishibashi | B60R 21/232 |
| 12,097,820 B1 * | 9/2024 | Moran | B60R 21/2165 |
| 2023/0182675 A1 * | 6/2023 | Crawford | B60R 21/201 280/730.2 |

* cited by examiner

*Primary Examiner* — Faye M Fleming
(74) *Attorney, Agent, or Firm* — Lorenz & Kopf LLP

(57) ABSTRACT

Roof airbags and methods for installation of the roof airbags in vehicles are provided. The roof airbags include a deployable airbag configured to automatically inflate in response to detection of a sensed event and to cover portions of an interior side of a vehicle upon being inflated, a continuous mounting tab extending from and along the deployable airbag that includes first and second mounting holes configured to receive first and second fasteners for securing the continuous mounting tab to a frame of the vehicle at first and second positions, respectively, and a reinforcement member disposed on the continuous mounting tab that is configured to prevent alignment of the first mounting hole and/or the second mounting hole with the first position and/or the second position, respectively, on the frame in response to the deployable airbag being twisted.

17 Claims, 6 Drawing Sheets

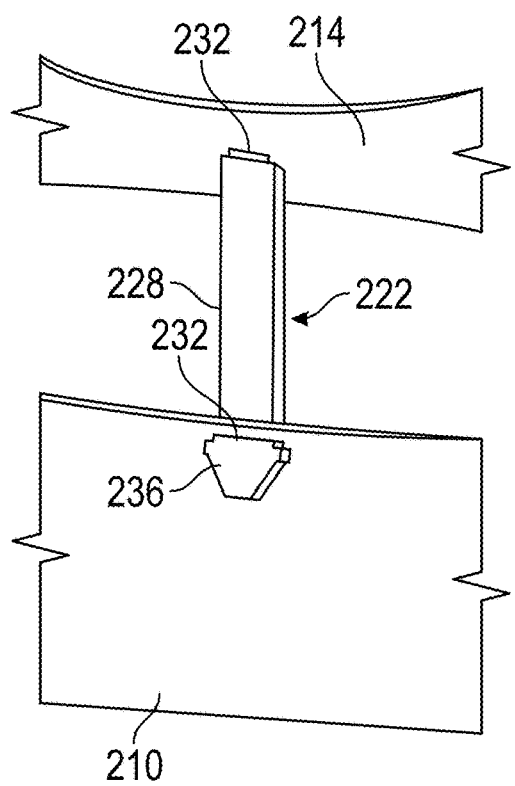
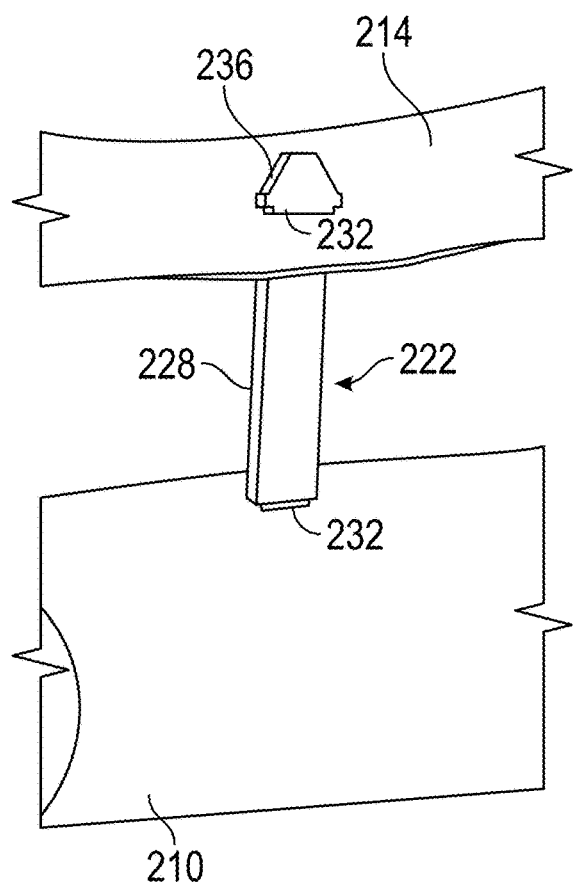
FIG. 5  FIG. 6
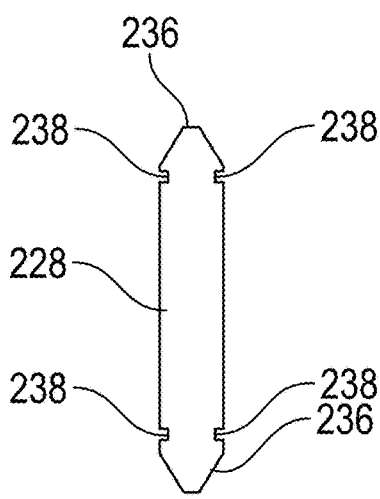
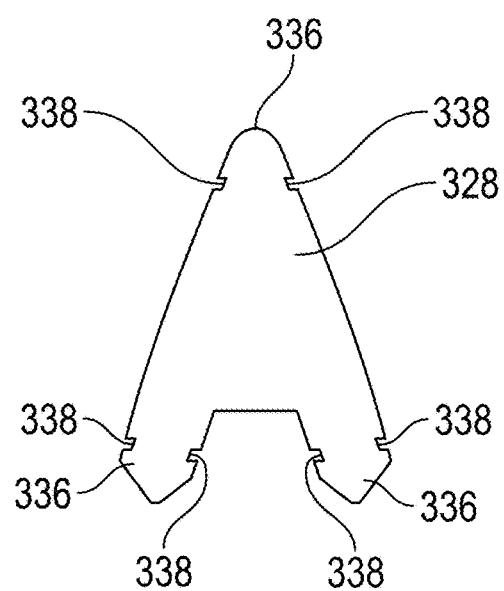
FIG. 7  FIG. 8

ROOF AIRBAGS AND METHODS OF INSTALLATION THEREOF

INTRODUCTION

The technical field generally relates to airbag systems in vehicles, and more particularly relates to roof or curtain airbags that include reinforcement members configured to prevent installation of the roof airbags in a vehicle if the roof airbags are twisted.

Roof airbags, also known as curtain airbags or side curtain airbags, are features in vehicles designed to deploy and restrain occupants during side-impacts or rollovers. Unlike traditional airbags that deploy from the steering wheel or dashboard, roof airbags deploy from the roof lining above the side windows, covering the windows like curtains.

In the event of a side-impact or rollover, sensors in the vehicle detect the impact and trigger the deployment of the roof airbags. The airbags inflate rapidly, forming a protective barrier between the occupants and the side windows and pillars. The inflated airbags provide a cushioning effect, reducing the impact force on the occupants and providing a barrier from the surfaces of the vehicle's interior, such as the side windows or pillars. Roof airbags typically extend from the front to the rear of the vehicle's cabin, covering the entire side window area. This extensive coverage restrains occupant movements in both the front and rear seats during side-impacts or rollovers.

Consistent and predictable operation of the roof airbags in response to an impact or rollover is desirable. Accordingly, there is an ongoing desire for systems and methods that promote functionality of roof airbags. Furthermore, other desirable features and characteristics of the present disclosure will become apparent from the subsequent detailed description and the appended claims, taken in conjunction with the accompanying drawings and the foregoing introduction.

SUMMARY

A roof airbag is provided for a vehicle. In one example, the roof airbag includes a deployable airbag configured to automatically inflate in response to detection of a sensed event and to cover portions of an interior side of a vehicle upon being inflated, a continuous mounting tab extending from and along the deployable airbag, the continuous mounting tab including at least a first mounting hole and a second mounting hole, the first mounting hole configured to receive a first fastener and the second mounting hole configured to receive a second fastener for securing the continuous mounting tab to a frame of the vehicle, wherein the first fastener is configured to be secured to a first position of the frame and the second fastener is configured to be secured to a second position of the frame, and a reinforcement member disposed on the continuous mounting tab that is configured to prevent alignment of the first mounting hole and/or the second mounting hole with the first position and/or the second position, respectively, on the frame in response to the deployable airbag being twisted.

In various examples, the continuous mounting tab of the roof airbag may include at least two accessory holes disposed between the first mounting hole and the second mounting hole that are each configured to provide access to portions of the frame overlaid by the continuous mounting tab while the continuous mounting tab is secured to the frame with the first fastener and the second fastener, wherein the reinforcement member is disposed between the at least two accessory holes.

In various examples, the reinforcement member of the roof airbag may include a fabric material.

In various examples, the reinforcement member of the roof airbag may include a rigid body secured to or disposed within a fabric material.

In various examples, the continuous mounting tab of the roof airbag may include an elongated accessory hole disposed between the first mounting hole and the second mounting hole that is configured to provide access to a portion of the frame overlaid by the continuous mounting tab while the continuous mounting tab is secured to the frame with the first fastener and the second fastener. The reinforcement member may include a rigid body that segments the elongated accessory hole. In various examples, the continuous mounting tab may include slots, and the rigid body of the reinforcement member is configured to be received within and maintained with the slots.

In various examples, the continuous mounting tab of the roof airbag may be configured to be secured to a roof rail or an A pillar of the vehicle.

A method is provided for a vehicle. In one example, the method includes providing a roof airbag comprising a deployable airbag configured to automatically inflate in response to detection of a sensed event and to cover portions of an interior side of a vehicle upon being inflated, a continuous mounting tab extending from and along the deployable airbag, and a reinforcement member disposed on the continuous mounting tab, securing a first mounting hole of the continuous mounting tab to a first position on a frame of the vehicle with a first fastener, preventing, with the reinforcement member, alignment of a second mounting hole of the continuous mounting tab with a second position on the frame of the vehicle in response to the deployable airbag being twisted, and securing the second mounting hole of the continuous mounting tab to the second position on the frame of the vehicle with a second fastener.

In various examples, the method may include, after securing the second mounting hole to the frame, coupling a pair of accessories to the frame at positions accessible via at least two accessory holes of the continuous mounting tab, wherein both of the at least two accessory holes are disposed between the first mounting hole and the second mounting hole and the reinforcement member is disposed between the at least two accessory holes.

In various examples, providing the roof airbag may include installing a fabric material to define at least part of the reinforcement member.

In various examples, providing the roof airbag may include installing a rigid body secured to or disposed within a fabric material to define at least part of the reinforcement member.

In various examples, the method may include, after securing the second mounting hole to the frame, coupling an accessory to the frame at a position accessible via an elongated accessory hole of the continuous mounting tab, wherein the reinforcement member includes a rigid body that segments the elongated accessory hole. In various examples, the continuous mounting tab of the method includes slots, and the method may include securing the rigid body of the reinforcement member to the continuous mounting tab by inserting ends of the rigid body into the slots.

In various examples, the first position and the second position of the frame of the method may be positions on a roof rail or an A pillar of the vehicle.

A vehicle is provided that, in one example, includes a frame comprising an A pillar disposed along a side of a windshield of the vehicle, and a roof airbag secured to the A pillar that includes: a deployable airbag configured to automatically inflate in response to detection of a sensed event and to cover portions of an interior side of the vehicle upon being inflated, a continuous mounting tab extending from and along the deployable airbag, the continuous mounting tab including at least a first mounting hole and a second mounting hole, the first mounting hole configured to receive a first fastener and the second mounting hole configured to receive a second fastener for securing the continuous mounting tab to a frame of the vehicle, wherein the first fastener is configured to be secured to a first position of the frame and the second fastener is configured to be secured to a second position of the frame, and a reinforcement member disposed on the continuous mounting tab that is configured to prevent alignment of the first mounting hole and/or the second mounting hole with the first position and/or the second position, respectively, on the frame in response to the deployable airbag being twisted.

In various examples, the continuous mounting tab of the vehicle may include at least two accessory holes disposed between the first mounting hole and the second mounting hole that are each configured to provide access to portions of the frame overlaid by the continuous mounting tab while the continuous mounting tab is secured to the frame with the first fastener and the second fastener, wherein the reinforcement member is disposed between the at least two accessory holes.

In various examples, the reinforcement member of the vehicle may include a fabric material.

In various examples, the reinforcement member of the vehicle may include a rigid body secured to or disposed within a fabric material.

In various examples, the continuous mounting tab of the vehicle may include an elongated accessory hole disposed between the first mounting hole and the second mounting hole that is configured to provide access to a portion of the frame overlaid by the continuous mounting tab while the continuous mounting tab is secured to the frame with the first fastener and the second fastener, wherein the reinforcement member includes a rigid body that segments the elongated accessory hole. In various examples, the continuous mounting tab may include slots, and the rigid body of the reinforcement member is configured to be received within and maintained with the slots.

BRIEF DESCRIPTION OF THE DRAWINGS

The exemplary embodiments will hereinafter be described in conjunction with the following drawing figures, wherein like numerals denote like elements, and wherein:

FIGS. 5 and 6 are enlarged views of a first reinforcement member of the second roof airbag of FIG. 4 in accordance with an example;

FIG. 7 is an isolated view of the first reinforcement member of FIGS. 5 and 6 in accordance with an example;

FIG. 8 is an isolated view of a second reinforcement member in accordance with an example.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
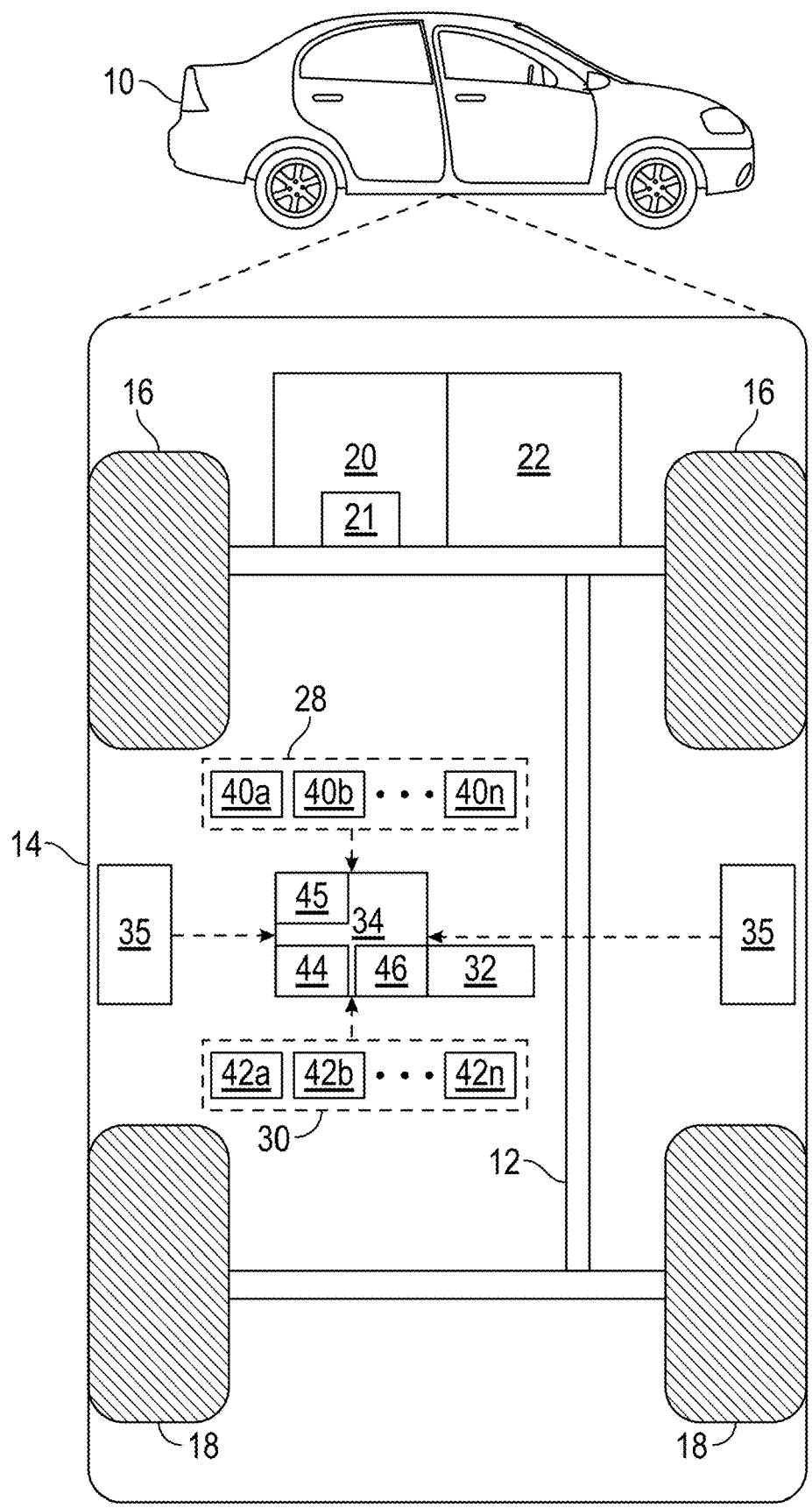
FIG. 1 is a functional block diagram of a vehicle including a roof airbag system in accordance with an example.

FIG. 1 illustrates a vehicle 10, according to an example. In certain examples, the vehicle 10 comprises an automobile. The vehicle 10 includes a roof airbag system having curtain or roof airbags for restraining occupants of the vehicle 10 in the event of a collision.

The roof airbags may include one or more features configured to promote proper installation and operation of the roof airbags, including a reinforcing member that prevents or reduces twisting of the roof airbags and/or prevents installation of the roof airbags while the roof airbag is twisted.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

Figure 2:
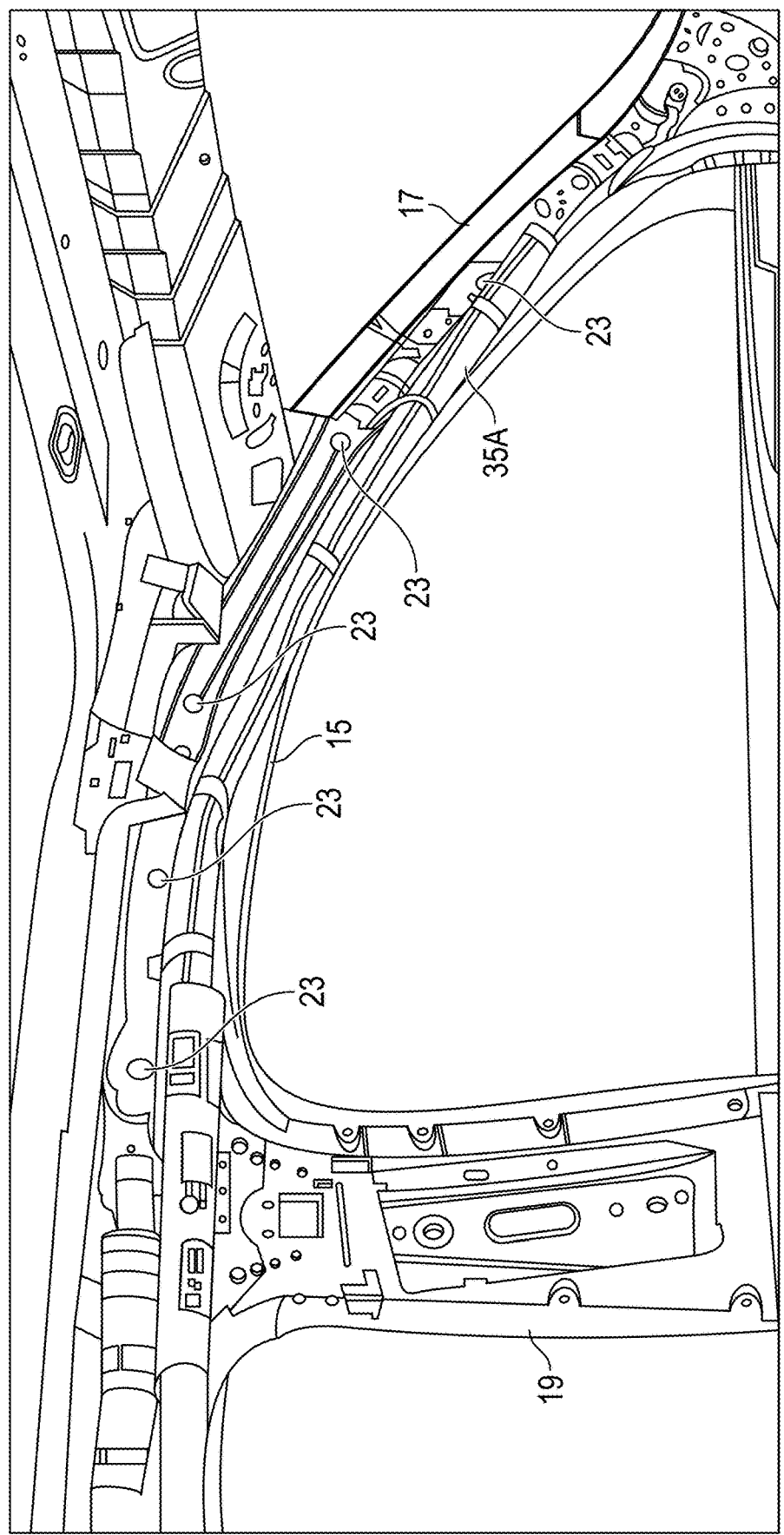
FIG. 2 is an interior view of a roof airbag installed to a frame of the vehicle of FIG. 1 in accordance with an example.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame 15 (FIG. 2). The wheels 16-18 are each rotationally coupled to the chassis 12 near a respective corner of the body 14.

The vehicle 10 further includes a propulsion system 20, a transmission system 22, a sensor system 28, an actuator system 30, at least one data storage device 32, at least one controller 34, and an airbag system including one or more roof airbags 35. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences positions of the wheels 16-18.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, current sensors, voltage sensors, temperature sensors, motor speed sensors, position sensors, radars, lidars, global positioning systems, optical cameras, thermal cameras, ultrasonic sensors, inertial measurement units, pressure sensors, position sensors, speed sensors, and/or other sensors. One of more of the sensing devices 40a-40n may be functional, individually or in combination, to indicate to the controller 34 that the vehicle 10 has been or will be in a collision or rollover event.

The actuator system 30 includes one or more actuator devices 42a-42n that control one or more vehicle features such as, but not limited to, the propulsion system 20, the transmission system 22, and/or an airbag system, including the roof airbags 35. One or more of the actuator devices 42a-42n may be functional, individually or in combination, to initiate deployment of the roof airbags 35 in response to predetermined conditions, such as detection that the vehicle 10 has been or will be in a collision or rollover event.

The airbag system includes airbags, including the one or more roof airbags 35. In some examples, the airbag system may include multiple airbags strategically placed throughout the cabin of the vehicle 10, including front, side, and roof airbags, to provide comprehensive protection. If a collision or rollover event occurs, one or more of the sensing devices 40a-40n detect, for example, the rapid deceleration of the vehicle 10 and send signals to the controller 34. In response to these sensed events, the controller 34 triggers the deployment of one or more of the airbags, such as the roof airbags 35. The airbags inflate rapidly to cushion occupants and reduce the impact of the collision.

Referring to FIG. 2, with continued reference to FIG. 1, an exemplary installation of one of the roof airbags 35 is presented. One or more roof airbags 35 may be secured to a roof rail of the vehicle 10 that extend along, for example, an A pillar of the frame 15, over a B pillar thereof, and towards, over, and/or along a C pillar and/or D pillar thereof. FIG. 2 shows a portion of the vehicle 10 as including a first roof airbag 35A of the roof airbags 35 secured to and extending along the A pillar 17 and over the B pillar 19. In this example, the first roof airbag 35A is secured to the frame 15 with fasteners 23.

FIGS. 3-8 illustrate various nonlimiting examples of roof airbags that, in some examples, may be used for one or more of the roof airbags 35. It should be noted that these examples are merely for illustrative purposes and the roof airbag system of FIG. 1 may have other configurations, including various combinations of the components represented in FIGS. 3-8. For convenience, consistent reference numbers are used throughout FIGS. 3-10 to identify the same or functionally related/equivalent elements, but with a numerical prefix (1, 2, or 3, etc.) added to distinguish the particular example from other examples of the of the figures. In view of similarities between the examples, the following discussion of FIGS. 3-8 will focus primarily on aspects of the examples that differ from the other examples in some notable or significant manner. Other aspects of the examples not discussed in any detail can be, in terms of structure, function, materials, etc., essentially as was described for one or more of the other examples.

Figure 3:
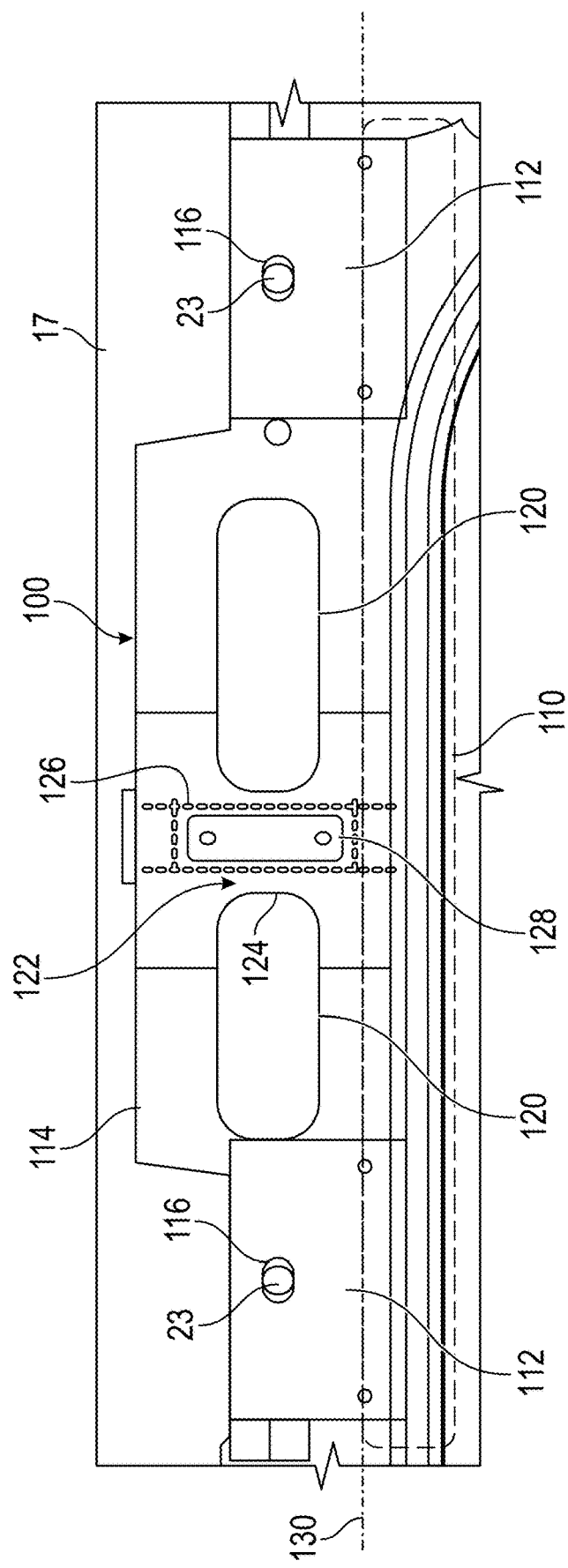
FIG. 3 is a side view of a portion of a first roof airbag in accordance with an example.

FIG. 3 presents a first example of a roof airbag 100 as installed in the vehicle 10 in accordance with certain examples. The first roof airbag 100 includes a deployable, inflatable body or airbag 10 configured to automatically deploy in response to detection of a collision or rollover event (e.g., as sensed by the sensor system 28, detected by the controller 34, and initiated by the actuator system 30) to cover portions of an interior side of a vehicle upon being deployed. At least two mounting tabs 112 extend from the deployable airbag 110. The mounting tabs 112 may each include one or more mounting holes 116 configured to be aligned with corresponding holes of the frame 15 and receive one of the corresponding fasteners 23 therethrough for securing the mounting tabs 112 at corresponding positions on the frame 15 of the vehicle 10. A reinforcement member 122 is disposed between the mounting holes 116 that is configured to prevent installation of the roof airbag 100 while the deployable airbag 110 is twisted about a longitudinal axis 130 thereof. In some examples, the reinforcement member 122 prevents alignment of the mounting holes 116 with the corresponding holes of the frame 15 while the deployable airbag 110 is twisted.

In this example, the mounting tabs 112 are portions of a continuous mounting tab. Specifically, the mounting tabs 112 are joined to each other by an intermediate portion 114 extending from and along the deployable airbag 110 between the mounting tabs 112. In various examples, the mounting tabs 112 and the intermediate portion 114 may be integral or may be separate bodies fixed to each other. In the example of FIG. 3, the intermediate portion 114 includes a pair of accessory holes 120 disposed between the mounting tabs 112. The accessory holes 120 are each configured to provide access to portions of the frame 15 overlaid by the continuous mounting tab while the mounting tabs 112 are secured to the frame 15 with the fasteners 23.

A reinforcement member 122 is disposed between the pair of accessory holes 120. In some examples, the reinforcement member 122 consists of a semi-flexible material (e.g., a fabric), consists of a rigid material (e.g., rigid polymer, metallic, ceramic, or composite material), or includes both a semi-flexible material and a rigid material. In the example of FIG. 3, the reinforcement member 122 includes a segmenting member 124 formed of a semi-flexible material and that segments the intermediate portion 114 between the accessory holes 120, a pocket or enclosure 126 disposed on the segmenting member 124, and a rigid member 128 formed of a rigid material and contained within the enclosure 126. The rigid member 128 includes an elongated body that extends from the deployable airbag 110 along the segmenting member 124. In some examples, the reinforcement member 122 and/or the rigid member 128 thereof may be centered or centrally located between the mounting holes 116.

As briefly discussed previously, the reinforcement member 122, the rigid member 128 thereof, or the combination thereof are configured to reduce a capability of the deployable airbag 110 to be twisted about the longitudinal axis 130 thereof, and/or prevent alignment of the mounting holes 116 with the corresponding holes of the frame 15 while the deployable airbag 110 is twisted about the longitudinal axis 130 thereof. For example, the continuous mounting tab, including the mounting tabs 112 and the intermediate portion 114, may be formed of a semi-flexible material (e.g., a fabric) and therefore, it may be possible to twist the deployable airbag 110 about the longitudinal axis 130. However, the reinforcement member 122 is configured to resist collapsing toward the deployable airbag 110, and therefore any twisting of the deployable airbag 110 results in the semi-flexible material being pulled toward the reinforcement member 122 which causes a dimensional change of the roof airbag 100 along the longitudinal axis 130. This dimensional change is sufficient such that it is not possible to simultaneously align both of the mounting holes 116 with the corresponding holes of the frame 15. Stated another way, the holes of the frame 15 may be separated by a first dimension d1, and twisting the roof airbag 100 may reduce a second dimension between the mounting holes 116 to less than the first dimension d1 to an extent such that the mounting holes 116 cannot be aligned with the holes of the frame 15. With such an arrangement, the roof airbag 100 cannot be installed in the vehicle 10 while twisted along the longitudinal axis 130.

Figure 4:
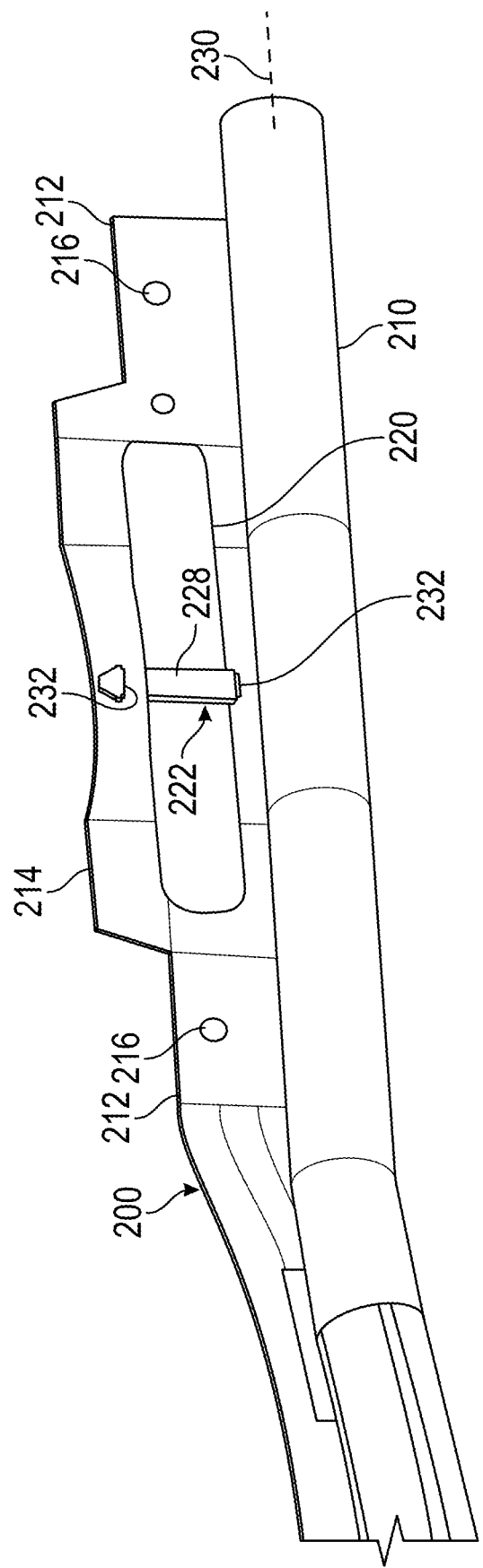
FIG. 4 is a perspective view of a portion of a second roof airbag in accordance with an example.

FIG. 4 presents a second example of a roof airbag 200 in accordance with certain examples. In this example, the reinforcement member 222 does not include a portion that is integral with the remainder of the intermediate portion 214 (e.g., the segmenting member 124). Instead, the intermediate portion 214 includes a single, elongated accessory hole 220, and the reinforcement member 222 consists of a rigid member 228 extending across the accessory hole 220 and coupled to portions of the intermediate portion 214 on opposite sides of the accessory hole 220. The rigid member 228 may be releasably or permanently affixed to the intermediate portion 214. In the example of FIGS. 4-7, the rigid member 228 includes an elongated body formed of a rigid material, tips 236 on opposite ends thereof, and recesses 238 on opposite edges of the elongated body separating the tips 236 from the remainder of the elongated body. The rigid member 228 may be coupled to the intermediate portion 214 by inserting the tips 236 into corresponding slots 232 of the intermediate portion 214. In the example shown, the slots 232 are stretched to accommodate the tips 236 and then retract to an initial size when aligned with the recesses 238. In this manner, the reinforcement member 222 may be releasably coupled to the intermediate portion 214.

The reinforcement member 222, the rigid member 228 thereof, or the combination thereof are configured to reduce a capability of the deployable airbag 210 to be twisted about the longitudinal axis 230 thereof, and/or prevent alignment of the mounting holes 216 with the corresponding holes of the frame 15 while the deployable airbag 210 is twisted about the longitudinal axis 230 thereof.

FIG. 8 presents another example of a rigid body 328 of a reinforcement member 322. In this example, the rigid body 328 defines are A-shape that includes three tips 336 and corresponding recesses 338. The rigid body 328 may be coupled to a roof airbag in substantially the same manner as the reinforcement member 222 if such roof airbag includes three slots in the intermediate portion thereof. Other rigid bodies may be used that include four or more tips and corresponding recesses, and/or that have shapes other than those presented in FIGS. 4-8.

Figure 9:
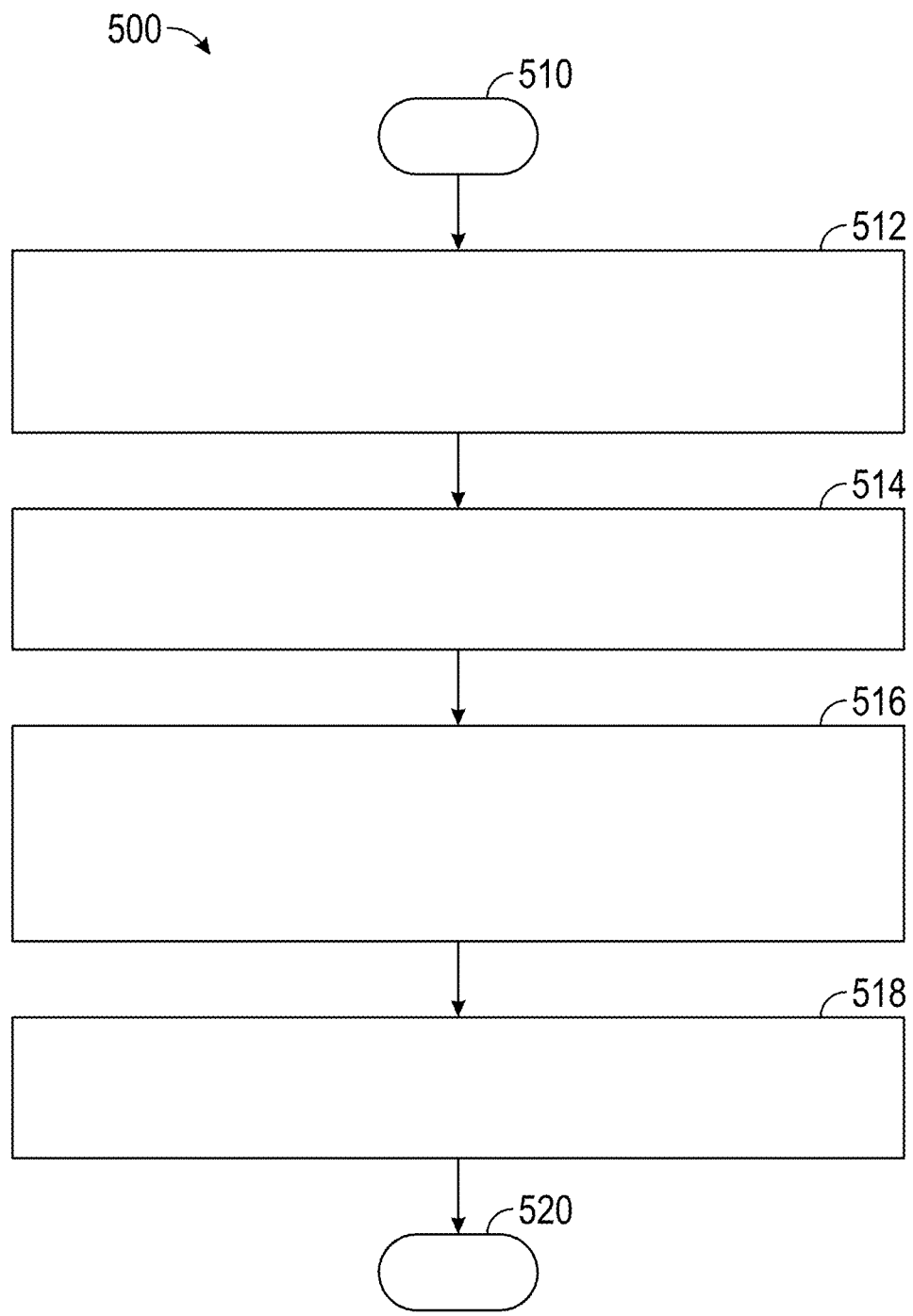
FIG. 9 is a flowchart illustrating a method in accordance with an example.

With reference now to FIG. 9 and with continued reference to FIGS. 1-8, a flowchart provides a method 500 for installation of a roof airbag in a vehicle, such as one of the roof airbags 35 in the vehicle 10, in accordance with various examples. As can be appreciated in light of the disclosure, the order of operation within the method 500 is not limited to the sequential execution as illustrated in FIG. 9, but may be performed in one or more varying orders as applicable and in accordance with the present disclosure.

In one example, the method 500 may start at 510. At 512, the method 500 may include providing the roof airbag (e.g., roof airbag 100, 200, or 400) comprising a deployable airbag, at least two mounting tabs extending from the deployable airbag, and a reinforcement member disposed between the mounting holes. At 514, the method 500 may include securing a first mounting tab of the at least two mounting tabs to a first position on a frame of the vehicle with a first fastener. At 516, the method 500 may include preventing alignment of a second mounting tab of the at least two mounting tabs with a second position on the frame of the vehicle while the deployable airbag is twisted about a longitudinal axis thereof with the reinforcement member. At 518, the method 500 may include securing the second mounting tab of the at least two mounting tabs to the second position on the frame of the vehicle with a second fastener. The method 500 may end at 520.

The systems and methods disclosed herein provide various benefits. For example, the system and methods disclosed herein provide roof airbags that cannot be installed in a vehicle while twisted.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A roof airbag, comprising:
   a deployable airbag configured to automatically inflate in response to detection of a sensed event and to cover portions of an interior side of a vehicle upon being inflated;
   a continuous mounting tab extending from and along the deployable airbag, the continuous mounting tab including at least a first mounting hole and a second mounting hole, the first mounting hole configured to receive a first fastener and the second mounting hole configured to receive a second fastener for securing the continuous mounting tab to a frame of the vehicle, wherein the first fastener is configured to be secured to a first position of the frame and the second fastener is configured to be secured to a second position of the frame; and
   a reinforcement member disposed on the continuous mounting tab that is configured to prevent alignment of the first mounting hole and/or the second mounting hole with the first position and/or the second position, respectively, on the frame in response to the deployable airbag being twisted, wherein the continuous mounting tab includes at least two accessory holes disposed between the first mounting hole and the second mounting hole that are each configured to provide access to portions of the frame overlaid by the continuous mounting tab while the continuous mounting tab is secured to the frame with the first fastener and the second fastener, wherein the reinforcement member is disposed between the at least two accessory holes.

2. The roof airbag of claim 1, wherein the reinforcement member includes a fabric material.

3. The roof airbag of claim 1, wherein the reinforcement member includes a rigid body secured to or disposed within a fabric material.

4. The roof airbag of claim 1, wherein the continuous mounting tab is configured to be secured to a roof rail or an A pillar of the vehicle.

5. A method, comprising:
   providing a roof airbag comprising a deployable airbag configured to automatically inflate in response to detection of a sensed event and to cover portions of an interior side of a vehicle upon being inflated, a continuous mounting tab extending from and along the deployable airbag, and a reinforcement member disposed on the continuous mounting tab;

securing a first mounting hole of the continuous mounting tab to a first position on a frame of the vehicle with a first fastener;

preventing, with the reinforcement member, alignment of a second mounting hole of the continuous mounting tab with a second position on the frame of the vehicle in response to the deployable airbag being twisted, wherein preventing alignment of the second mounting hole with the second position includes causing a dimensional change of the deployable airbag with the reinforcement member in response to the deployable airbag being twisted; and securing the second mounting hole of the continuous mounting tab to the second position on the frame of the vehicle with a second fastener.

6. The method of claim 5, further comprising, after securing the second mounting hole to the frame, coupling a pair of accessories to the frame at positions accessible via at least two accessory holes of the continuous mounting tab, wherein both of the at least two accessory holes are disposed between the first mounting hole and the second mounting hole and the reinforcement member is disposed between the at least two accessory holes.

7. The method of claim 5, wherein providing the roof airbag includes installing a fabric material to define at least part of the reinforcement member.

8. The method of claim 5, wherein providing the roof airbag includes installing a rigid body secured to or disposed within a fabric material to define at least part of the reinforcement member.

9. The method of claim 5, further comprising, after securing the second mounting hole to the frame, coupling an accessory to the frame at a position accessible via an elongated accessory hole of the continuous mounting tab, wherein the reinforcement member includes a rigid body that segments the elongated accessory hole.

10. The method of claim 9, wherein the continuous mounting tab includes slots, and the method includes securing the rigid body of the reinforcement member to the continuous mounting tab by inserting ends of the rigid body into the slots.

11. The method of claim 5, wherein the first position and the second position of the frame are both positions on a roof rail or an A pillar of the vehicle.

12. A roof airbag, comprising:

a deployable airbag configured to automatically inflate in response to detection of a sensed event and to cover portions of an interior side of a vehicle upon being inflated;

a continuous mounting tab extending from and along the deployable airbag, the continuous mounting tab including at least a first mounting hole and a second mounting hole, the first mounting hole configured to receive a first fastener and the second mounting hole configured to receive a second fastener for securing the continuous mounting tab to a frame of the vehicle, wherein the first fastener is configured to be secured to a first position of the frame and the second fastener is configured to be secured to a second position of the frame; and a reinforcement member disposed on the continuous mounting tab that is configured to prevent alignment of the first mounting hole and/or the second mounting hole with the first position and/or the second position, respectively, on the frame in response to the deployable airbag being twisted, wherein the continuous mounting tab includes an elongated accessory hole disposed between the first mounting hole and the second mounting hole that is configured to provide access to a portion of the frame overlaid by the continuous mounting tab while the continuous mounting tab is secured to the frame with the first fastener and the second fastener, wherein the reinforcement member includes a rigid body that segments the elongated accessory hole.

13. The roof airbag of claim 12, wherein the reinforcement member includes a fabric material.

14. The roof airbag of claim 12, wherein the reinforcement member includes a rigid body secured to or disposed within a fabric material.

15. The roof airbag of claim 12, wherein the continuous mounting tab includes slots, and the rigid body of the reinforcement member is configured to be received within and maintained with the slots.

16. The roof airbag of claim 1, wherein the reinforcement member is configured to cause a dimensional change of the deployable airbag in response to the deployable airbag being twisted and thereby prevent the alignment of the first mounting hole and/or the second mounting hole with the first position and/or the second position, respectively, on the frame.

17. The roof airbag of claim 12, wherein the reinforcement member is configured to cause a dimensional change of the deployable airbag in response to the deployable airbag being twisted and thereby prevent the alignment of the first mounting hole and/or the second mounting hole with the first position and/or the second position, respectively, on the frame.

* * * * *